(12) United States Patent
Lin

(10) Patent No.: US 9,182,423 B2
(45) Date of Patent: Nov. 10, 2015

(54) THERMAL CONVECTION TYPE ANGULAR ACCELEROMETER

(71) Applicant: CHUNG HUA UNIVERSITY, Hsinchu (TW)

(72) Inventor: Jium Ming Lin, Hsinchu (TW)

(73) Assignee: CHUNG HUA UNIVERSITY, Hsinchu (TW)

( * ) Notice: Subject to any disclaimer, the term of this patent is extended or adjusted under 35 U.S.C. 154(b) by 324 days.

(21) Appl. No.: 13/932,730

(22) Filed: Jul. 1, 2013

(65) Prior Publication Data

US 2014/0007684 A1   Jan. 9, 2014

(30) Foreign Application Priority Data

Jul. 3, 2012   (TW) ............................... 101123847 A

(51) Int. Cl.
*G01P 15/00*   (2006.01)
(52) U.S. Cl.
CPC ..................... *G01P 15/008* (2013.01)
(58) Field of Classification Search
CPC ..................................................... G01P 15/008
USPC .............................. 73/514.03, 514.05, 514.09
See application file for complete search history.

(56) References Cited

U.S. PATENT DOCUMENTS

| | | | |
|---|---|---|---|
| 6,182,509 B1 | 2/2001 | Leung | |
| 8,307,708 B2 | 11/2012 | Lin | |
| 2005/0274180 A1 | 12/2005 | Zhao et al. | |
| 2007/0101813 A1* | 5/2007 | Hua et al. | 73/514.16 |
| 2007/0251938 A1 | 11/2007 | Lin et al. | |
| 2011/0036168 A1* | 2/2011 | Lin | 73/514.05 |
| 2011/0100123 A1* | 5/2011 | Lin | 73/514.03 |
| 2013/0133425 A1 | 5/2013 | Lin | |

FOREIGN PATENT DOCUMENTS

| | | |
|---|---|---|
| CN | 1525145 A | 9/2004 |
| CN | 102012437 A | 4/2011 |
| CN | 102053167 A | 5/2011 |
| TW | 200746874 A | 12/2007 |
| TW | 201114678 A | 5/2011 |

OTHER PUBLICATIONS

Taiwan Office Action dated May 19, 2014 for counterpart Taiwan application 101123847.

(Continued)

*Primary Examiner* — Daniel S Larkin
*Assistant Examiner* — Irving A Campbell
(74) *Attorney, Agent, or Firm* — WPAT, P.C.; Anthony King

(57) ABSTRACT

A thermal convection type angular accelerometer includes an insulating substrate and an angular acceleration sensing device. The angular acceleration sensing device is disposed on the insulating substrate. The angular acceleration sensing device is configured to measure an angular acceleration of a rotation axis. The angular acceleration sensing device comprises a sensing group. The sensing group comprises two temperature sensing members and a heater disposed between the two temperature sensing members. The distance between two ends of the two temperature sensing members near the rotation axis is greater than the distance between the other two ends of the two temperature sensing members that are farther from the rotation axis.

21 Claims, 15 Drawing Sheets

(56) References Cited

OTHER PUBLICATIONS

English abstract of Taiwan Office Action dated May 19, 2014 for counterpart Taiwan application 101123847.
US2011/0100123 is the US counterpart application for TW201114678A.
US2007/0251938 is the US counterpart application for TW200746874A.
Office Action dated Mar. 2, 2015 from the Chinese counterpart application 201210245282.2.
Search Report dated Mar. 2, 2015 from the Chinese counterpart application 201210245282.2.
English abstract translation of the Office Action dated Mar. 2, 2015 from the Chinese counterpart application 201210245282.2, CN102053167, CN102012437, CN1525145 and TW201114678.

* cited by examiner

THERMAL CONVECTION TYPE ANGULAR ACCELEROMETER

CROSS-REFERENCE TO RELATED APPLICATION

The present application is based on, and claims priority from, Taiwan Patent Application Serial Number 101123847, filed on Jul. 3, 2012, the disclosure of which is hereby incorporated by reference herein in its entirety.

BACKGROUND OF THE INVENTION

1. Field of the Invention

The present invention relates to an angular accelerometer, and relates more particularly to a thermal convection type angular accelerometer.

2. Description of the Related Art

U.S. Pat. No. 6,182,509 discloses a thermal convection type accelerometer which comprises a silicon substrate, a heater, and a pair of temperature sensitive elements. The silicon substrate has a chamber, across which the heater and the pair of temperature sensitive elements extend, and the two temperature sensitive elements are equidistant from the heater.

In order to form a heater and two temperature sensitive elements extending across a chamber, a fabrication method initially forms an oxide layer on the substrate. Next, a polysilicon layer is formed on the oxide layer. Thereafter, an oxidation process is performed to form another oxide layer on the polysilicon layer. Subsequently, the polysilicon layer is patterned to form three polysilicon bridges. Afterward, another oxidation process is performed to form oxide layers on the lateral sides of the polysilicon bridges. Next, a deep cavity is formed by etching the substrate using EDP, which is a mixture of ethylenediamine, pyrocatechol, and water.

From the above statement, it can be seen that the fabrication method for forming a heater and two temperature sensitive elements extending across a cavity is complex; thus, the thermal convection type accelerometer is expensive. Moreover, the slender polysilicon bridges are easily damaged during fabrication, resulting in low yield. Further, the slender polysilicon bridges are easily deteriorated during long term use. In addition, the substrate is of silicon, and heat from the heater can easily dissipate due to silicon having a high thermal conductivity (1.48 W/(cm-K)). Thus, the heater should be suspended over a cavity in order to consume less energy. However, when a cavity is applied, the silicon substrate still dissipates significant amounts of energy, causing such a thermal convection accelerometer to consume more energy.

Moreover, the thermal convection accelerometer can have a chamber, which is filled with carbon dioxide or air. The carbon dioxide or air may oxidize the heater and the temperature sensitive elements, resulting in poor performance and a shorter lifespan.

In addition, conventional angular accelerometers comprise piezoelectric transducers or mechanical gyroscopes. The conventional angular accelerometers are large and complex, and they can be expensive or require extended lengths of time when being repaired. With the development of MEMS technologies, small MEMS-based gyroscopes are introduced. A MEMS-based gyroscope may comprise a comb structure, and acceleration can be determined by measuring a change of parasitic capacitance or resonant frequency of the comb structure. However, the movable comb structure may be subject to mechanical fatigue. As a result, the MEMS-based gyroscope usually has a short lifespan.

SUMMARY OF THE INVENTION

One embodiment of the present invention discloses a thermal convection type angular accelerometer. The thermal convection type angular accelerometer comprises a first insulating substrate and a first angular acceleration sensing device. The first angular acceleration sensing device is disposed on the first insulating substrate. The first angular acceleration sensing device is configured to measure an angular acceleration of a first axis. The first angular acceleration sensing device comprises a sensing group. The sensing group comprises two temperature sensing members and a heater. The heater can be disposed between the two temperature sensing members. A distance between two ends of the two temperature sensing members close to the first axis is greater than the distance between two ends of the two temperature sensing members far from the first axis.

To better understand the above-described objectives, characteristics and advantages of the present invention, embodiments, with reference to the drawings, are provided for detailed explanations.

BRIEF DESCRIPTION OF THE DRAWINGS

The invention will be described according to the appended drawings in which.

DETAILED DESCRIPTION OF THE INVENTION

In some embodiments, a thermal convection type angular accelerometer comprises at least one heater and a plurality of temperature sensing members. The heater and the plurality of temperature sensing members are not suspended. Therefore, the thermal convection type angular accelerometer can be easily manufactured and is less likely to be damaged.

In some embodiments, a thermal convection type angular accelerometer comprises a plurality of temperature sensing members and a cover. The cover only covers a portion of each temperature sensing member so that the outside portion of each temperature sensing member is exposed to ambient temperature. Consequently, more accurate temperature calibrations and measurements can be achieved.

Figure 1:
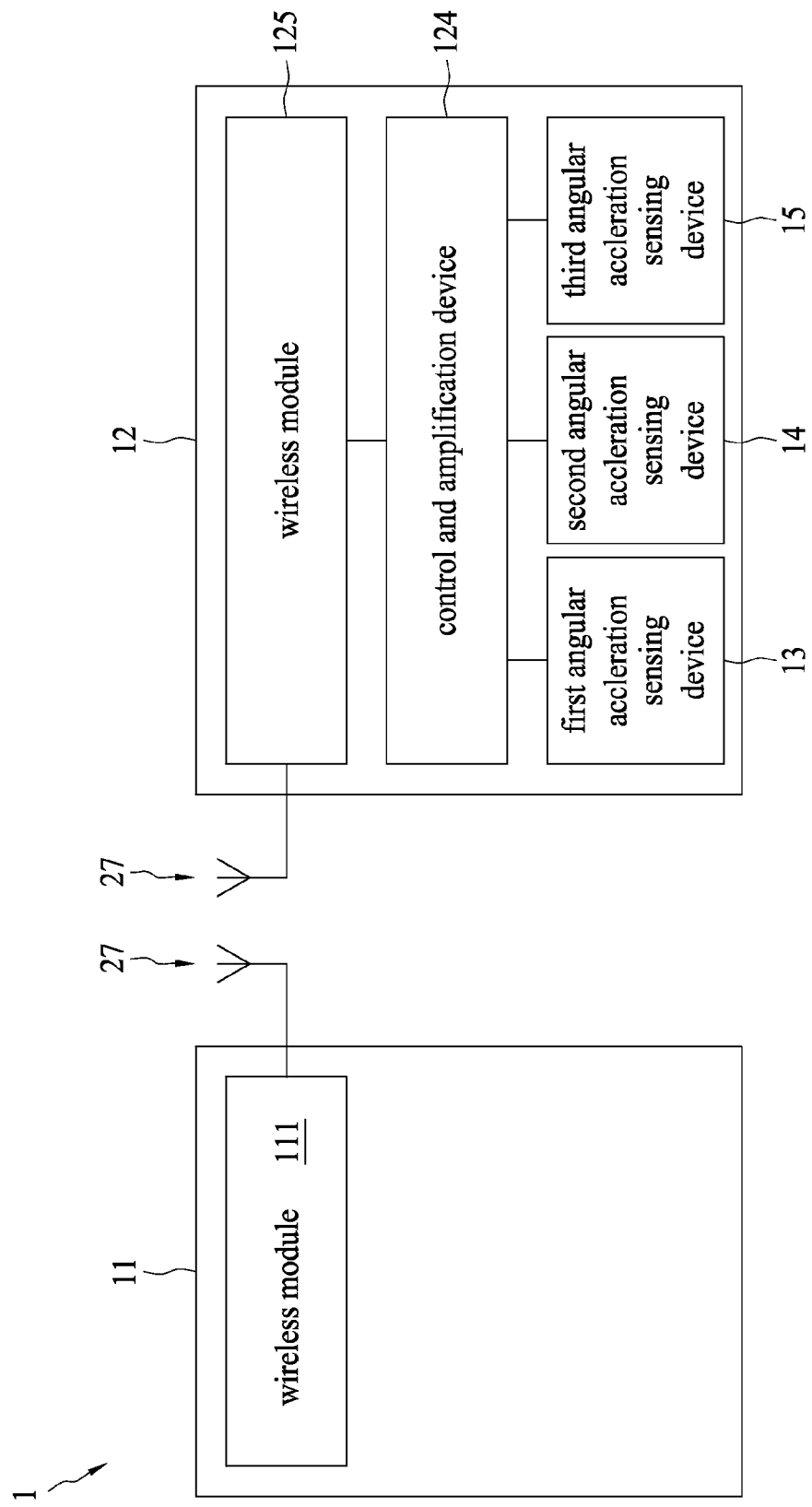
FIG. 1 is a schematic view showing an angular acceleration measurement system according to one embodiment of the present invention.

FIG. 1 is a schematic view showing an angular acceleration measurement system according to one embodiment of the present invention. Referring to FIG. 1, the angular acceleration measurement system 1 comprises a monitoring apparatus 11 and a thermal convection type angular accelerometer 12. The thermal convection type angular accelerometer 12 can be configured to at least measure an angular acceleration of an axis. In the present embodiment, the thermal convection type angular accelerometer 12 comprises a first angular acceleration sensing device 13, a second angular acceleration sensing device 14, and a third angular acceleration sensing device 15, wherein the first angular acceleration sensing device 13, the second angular acceleration sensing device 14, and the third angular acceleration sensing device 15 are configured to measure accelerations of different axes. In some embodiments, the first angular acceleration sensing device 13, the second angular acceleration sensing device 14, and the third angular acceleration sensing device 15 are configured to respectively measure angular accelerations of the X-axis, Y-axis, and Z-axis of a Cartesian coordinate system. In some embodiments, the first angular acceleration sensing device 13, the second angular acceleration sensing device 14, and the third angular acceleration sensing device 15 may be coupled with a control and amplification device 124 that is configured to control, amplify, and transmit signals from the first angular acceleration sensing device 13, the second angular acceleration sensing device 14, and the third angular acceleration sensing device 15. The thermal convection type angular accelerometer 12 may further comprise a wireless module 125 that is configured to transmit signals to or from a wireless module 111 of the monitoring apparatus 11 by a communication standard and protocol so that the monitoring apparatus 11 can monitor or obtain angular accelerations measured by the thermal convection type angular accelerometer 12. The communication standard and protocol may comprise RFID (radio frequency identification) protocol, ZigBee protocol, or Bluetooth protocol.

Figure 2:
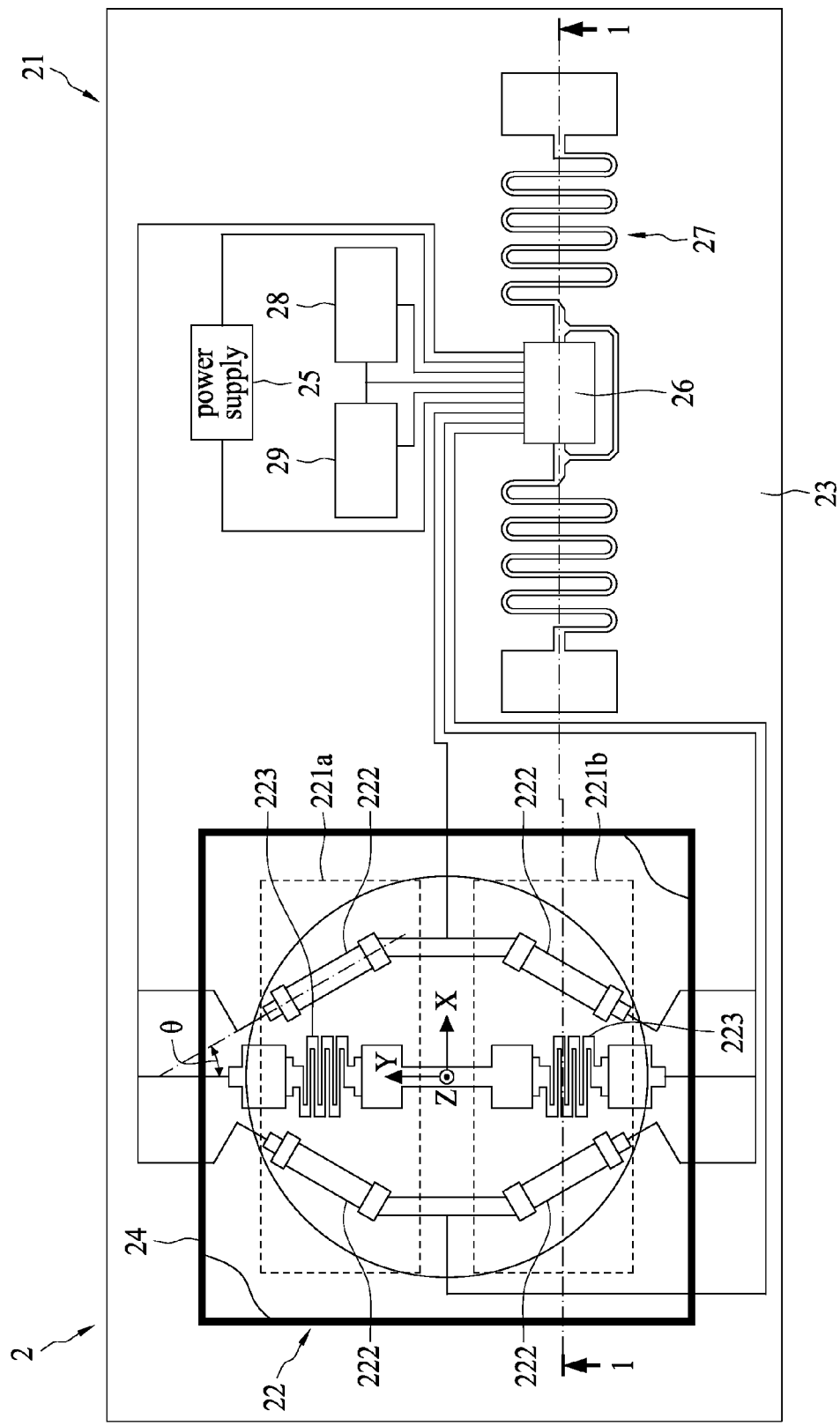
FIG. 2 is a schematic view showing a thermal convection type angular accelerometer according to one embodiment of the present invention.
Figure 3:
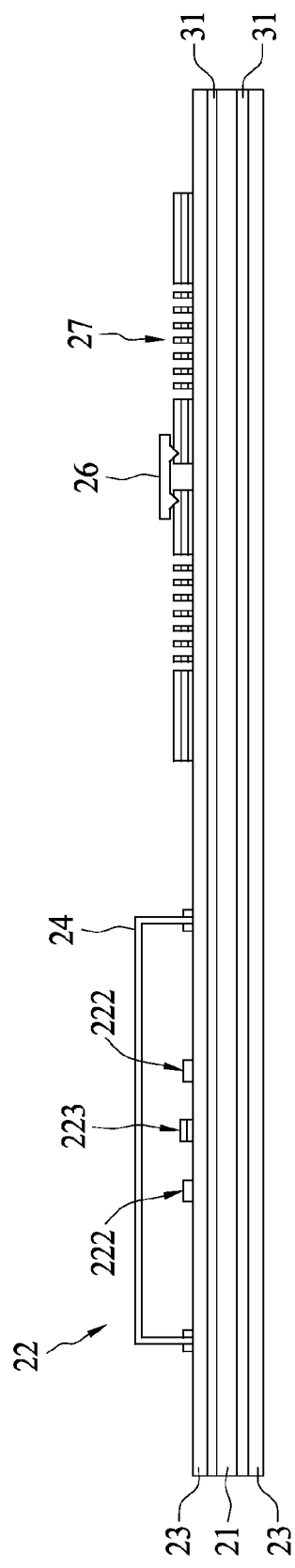
FIG. 3 is a cross-sectional view along line 1-1 of FIG. 2.

FIG. 2 is a schematic view showing a thermal convection type angular accelerometer according to one embodiment of the present invention. FIG. 3 is a cross-sectional view along line 1-1 of FIG. 2. Referring to FIGS. 2 and 3, the thermal convection type angular accelerometer 2 comprises an insulating substrate 21, an angular acceleration sensing device 22, and a supporting layer 23, wherein the supporting layer 23 is disposed on the insulating substrate 21 and configured to support the angular acceleration sensing device 22. Due to having no cavity, the thermal convection type angular accelerometer 2 can be manufactured by a simple method.

As shown in FIG. 2, the angular acceleration sensing device 22 comprises at least one sensing group 221a or 221b that is configured to measure angular acceleration of an axis perpendicular to the plane of FIG. 2. In the present embodiment, the axis is the Z-axis. In the present embodiment, the angular acceleration sensing device 22 comprises two sensing groups 221a and 221b. The two sensing groups 221a and 221b can be disposed opposite to each other; however, the present invention is not limited to such an embodiment.

Each sensing group 221a or 221b may comprise two temperature sensing members 222 and a heater 223. The heater 223 can be disposed between the two temperature sensing members 222. Two ends of the two temperature sensing members 222 near the Z-axis can be separated by a distance greater than the distance between the other two ends of the two temperature sensing members 222 that are farther from the Z-axis. In addition, each temperature sensing member 222 forms an included angle θ with the heater 223, wherein the included angle θ can be between 25 and 35 degrees. Preferably, the included angle θ is 30 degrees.

In the present disclosure, when modified by the word "substantially," it is understood that the object of the modifier would be considered close enough to be recognized by those of ordinary skill in the art as being within the general genus of such objects. For example, "substantially spherical" refers to an object that, while not a mathematically perfect sphere, would be easily recognized as being within reasonable bounds of that which those skilled in the art would readily consider "spherical."

Referring to FIG. 2, the two sensing groups 221a and 221b are oppositely disposed. The heater 223 of the sensing group 221a may connect to the heater 223 of the sensing group 221b. Two temperature sensing members 222 of the sensing group 221a may connect to the two corresponding temperature sensing members 222 of the sensing group 221b to form a Wheatstone bridge.

In some embodiments, the thermal convection type angular accelerometer 2 comprises a cover 24 that is configured to prevent the influence of an ambient environment on the angular acceleration sensing device 22. The cover 24 can be secured by an adhesive. In some embodiments, the cover 24 is configured to completely cover the two sensing groups 221a and 221b. In some embodiments, the thermal convection type angular accelerometer 2 may further comprise an inert gas, which can be disposed within the cover 24. In some embodiments, the inert gas comprises argon, krypton, or xenon.

The cover 24 can be externally rectangular and internally rectangular, hemi-cylindrical, or hemi-spherical. The hemi-cylindrical or hemi-spherical internal space allows the inside gas to flow more smoothly so that the sensitivity of the thermal convection type angular accelerometer can be significantly improved. In comparison, conventional angular accelerometers have rectangular internal spaces.

In some embodiments, the thermal convection type angular accelerometer 2 may further comprise a power supply 25. The power supply 25 can be configured to at least provide electric power to the angular acceleration sensing device 22. In the present embodiment, the power supply 25 is coupled with a chip 26. The four temperature sensing members 222 of the two sensing groups 221a and 221b are connected as a Wheatstone bridge circuit, which is then connected with the chip 26. The connections of the present embodiment are explained as follows. Two corresponding temperature sensing members 222 of the two sensing groups 221a and 221b on the same side of the heaters 223 are series-connected by connecting their inner ends. The external ends of the temperature sensing members 222 and the heater 223 of each sensing group 221a or 221b are connected together to two connection points, which are connected with two respective terminals of the chip 26, such as power and ground terminals. As a result, a Wheatstone bridge circuit is formed.

The chip 26 is configured to simultaneously supply electrical power to the two sensing groups 221a and 221b or the two heaters 223 in order to measure angular acceleration of the Z-axis. Simultaneously supplying electrical power provides an advantage in that such supplied electrical power can be controlled. In one embodiment, the chip 26 is configured to provide electrical pulses of power to consume less energy.

Figure 4:
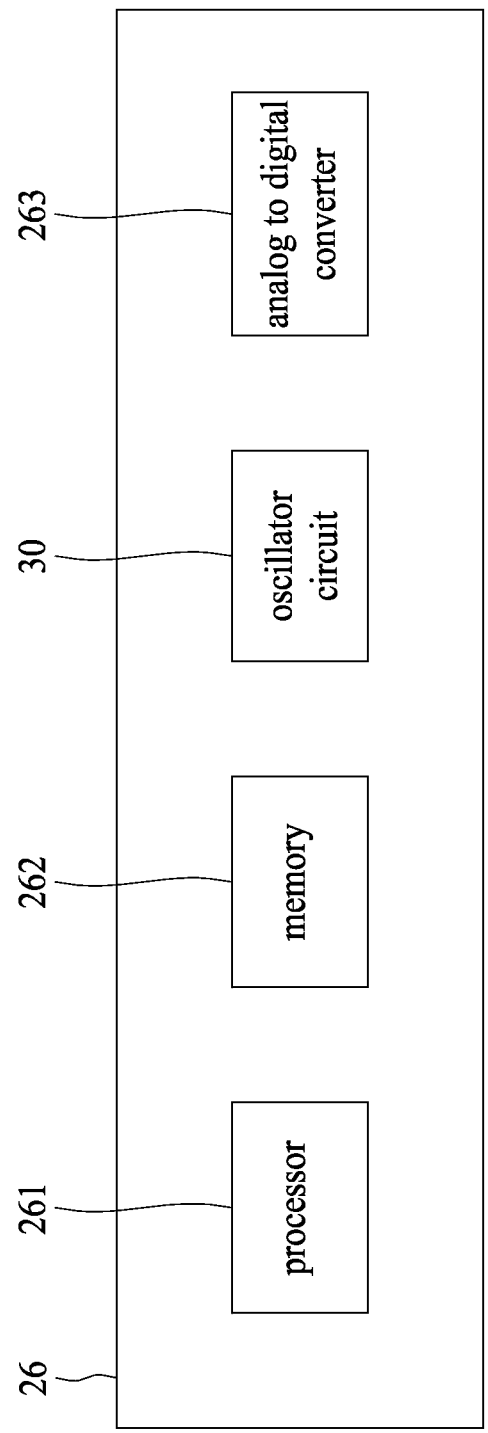
FIG. 4 is a functional diagram of a chip according to one embodiment of the present invention.

In the present embodiment, the chip 26 may comprise an analog-to-digital converter 263 as shown in FIG. 4. The analog-to-digital converter 263 can be coupled with wires, where each of which connects to a connection point between the temperature sensing member 222 of the sensing group 221a and the temperature sensing member 222 of the sensing group 221b or the midpoint of one leg of the Wheatstone bridge circuit. Through the afore-mentioned connection, the analog-to-digital converter 263 can obtain a voltage difference across the two connection points between the temperature sensing members 222 of the sensing group 221a and the temperature sensing members 222 of the sensing group 221b (i.e., the midpoints of the legs of the Wheatstone bridge circuit), the voltage is caused by the changes of the resistances of the temperature sensing members 222 of the sensing group 221a and 221b when the thermal convection type angular accelerometer 2 is rotated. The voltage difference can be used to determine the angular acceleration of the thermal convection type angular accelerometer 2.

In some embodiments, the chip 26 may comprise the afore-mentioned control and amplification device 124 and the afore-mentioned wireless module 125.

In some embodiments, the temperature sensing member 222 can be a resistor. In some embodiments, each temperature sensing members 222 may comprise a plurality of series-connected resistors. In some embodiments, the temperature sensing members 222 may comprise p-type semiconductors. In some embodiments, the temperature sensing members 222 may comprise doped p-type poly-silicon.

In some embodiments, the heater 223 may comprise nickel and/or chromium.

Referring to FIG. 4, in some embodiments, the chip 26 may comprise a processor 261 and a memory 262. The processor 261 may integrate measured angular acceleration to determine the angular speed and/or the rotation angle of a carrier or vehicle. When the thermal convection type angular accelerometer 2 is installed on an object, the rotation angle and angular speed of the Z-axis can be accordingly determined.

Referring to FIGS. 1 and 2, in the present embodiment, the thermal convection type angular accelerometer 2 may further comprise an antenna 27. The thermal convection type angular accelerometer 2 can use the antenna 27 to communicate with the monitoring apparatus 11 to transmit measured values or receive instructions. In some embodiments, the thermal convection type angular accelerometer 2 communicates by using RFID protocol. With such a design, the thermal convection type angular accelerometer 2 may support a passive mode. In the passive mode, a rectifier, optionally disposed in the chip 26, of the thermal convection type angular accelerometer 2 may convert microwave signals received by the antenna 27 into electrical power that the thermal convection type angular accelerometer 2 requires during operation. In order to provide stable electrical power, a capacitor 28 can be further disposed on the thermal convection type angular accelerometer 2, as shown in FIG. 2. Furthermore, the control and amplification device 124 of the chip 26 of the thermal convection type angular accelerometer 2 can further comprise an oscillator circuit 30. The oscillator circuit 30 is configured to generate a clock signal. In addition, the oscillator circuit 30 may also be coupled with a resistor 29 and another capacitor. In some embodiments, the resistor 29 may comprise at least one metal. In some embodiments, the resistor 29 may comprise chromium, nickel, and gold. In some embodiments, the resistor 29 may comprise doped p-type poly-silicon.

The antenna 27 may comprise at least one metal. In some embodiments, the antenna 27 may comprise chromium and nickel. In some embodiments, the surface of the chromium and nickel layers can be coated by gold so that the sensitivity of the thermal convection type angular accelerometer 2 can be improved.

Figure 5:
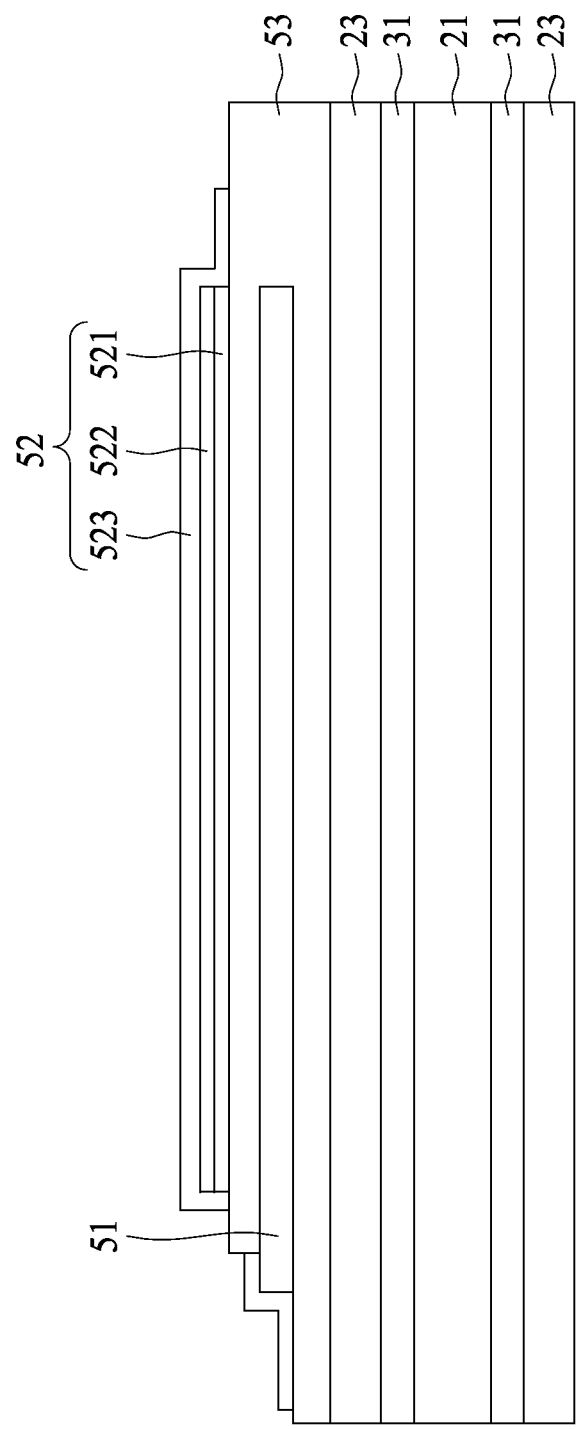
FIG. 5 is a cross-sectional view of a capacitor according to one embodiment of the present invention.

Referring to FIG. 5, the capacitor 28 can be a thin film capacitor, which may comprise a lower electrode 51, an upper electrode 52, and a dielectric layer 53. In some embodiments, the lower electrode 51 may comprise doped p-type poly-silicon. In some embodiments, the upper electrode 52 may comprise at least one metal. In some embodiments, the upper electrode 52 may comprise a chromium layer 521, a nickel layer 522, and a gold layer 523. In some embodiments, the dielectric layer 53 may comprise silicon nitride or the like.

Preferably, referring to FIGS. 2 and 3, the supporting layer 23 is used to support the angular acceleration sensing device 22. The temperature sensing members 222 and the heaters 223 of the sensing groups 221a and 221b are directly formed on or supported by the supporting layer 23. Thus, as opposed to the design in which a heater and temperature sensors are suspended over a cavity, the heaters 223 and the temperature sensing members 222 of the present disclosure will not be easily damaged during fabrication or consumed during long term use. In some embodiments, the supporting layer 23 comprises polymer. In some embodiments, the supporting layer 23 comprises an insulation polymer material. The insulation polymer material can reduce the dissipation of heat from the heaters 223, and as a result, the thermal convection type angular accelerometer 2 consumes less energy. In some embodiments, the supporting layer 23 comprises a positive photo-resist. In some embodiments, the supporting layer 23 comprises a positive photo-resist with a thickness of 5 to 100 micrometers.

As shown in FIG. 3, the thermal convection type angular accelerometer 2 may further comprise an isolating layer 31, which may be directly formed on the insulating substrate 21. The isolating layer 31 can be used as heat insulation and a moisture barrier. In some embodiments, the isolating layer 31 may comprise silicon dioxide with a thickness of 1 to 10 micrometers. The supporting layer 23 can be directly formed on the isolating layer 31.

In some embodiments, the insulating substrate 21 comprises polymer. In some embodiments, the insulating substrate 21 is flexible. In some embodiments, the insulating substrate 21 may comprise polythiophene, polyethylene terephtalate, or polyimide.

Referring again to FIG. 4, the chip 26 may further comprise a memory 262. In some embodiments, the memory 262 may store a compensation value for a bias in the measurement of angular acceleration by the angular acceleration sensing device 22. In some embodiments, the memory 262 may store a rotation angle of the angular acceleration sensing device 22.

The memory 262 can be a volatile memory device or a non-volatile memory device. The memory 262 may comprise dynamic random-access memory (DRAM), static random-access memory (SRAM), flash memory, or the like.

Figure 6:
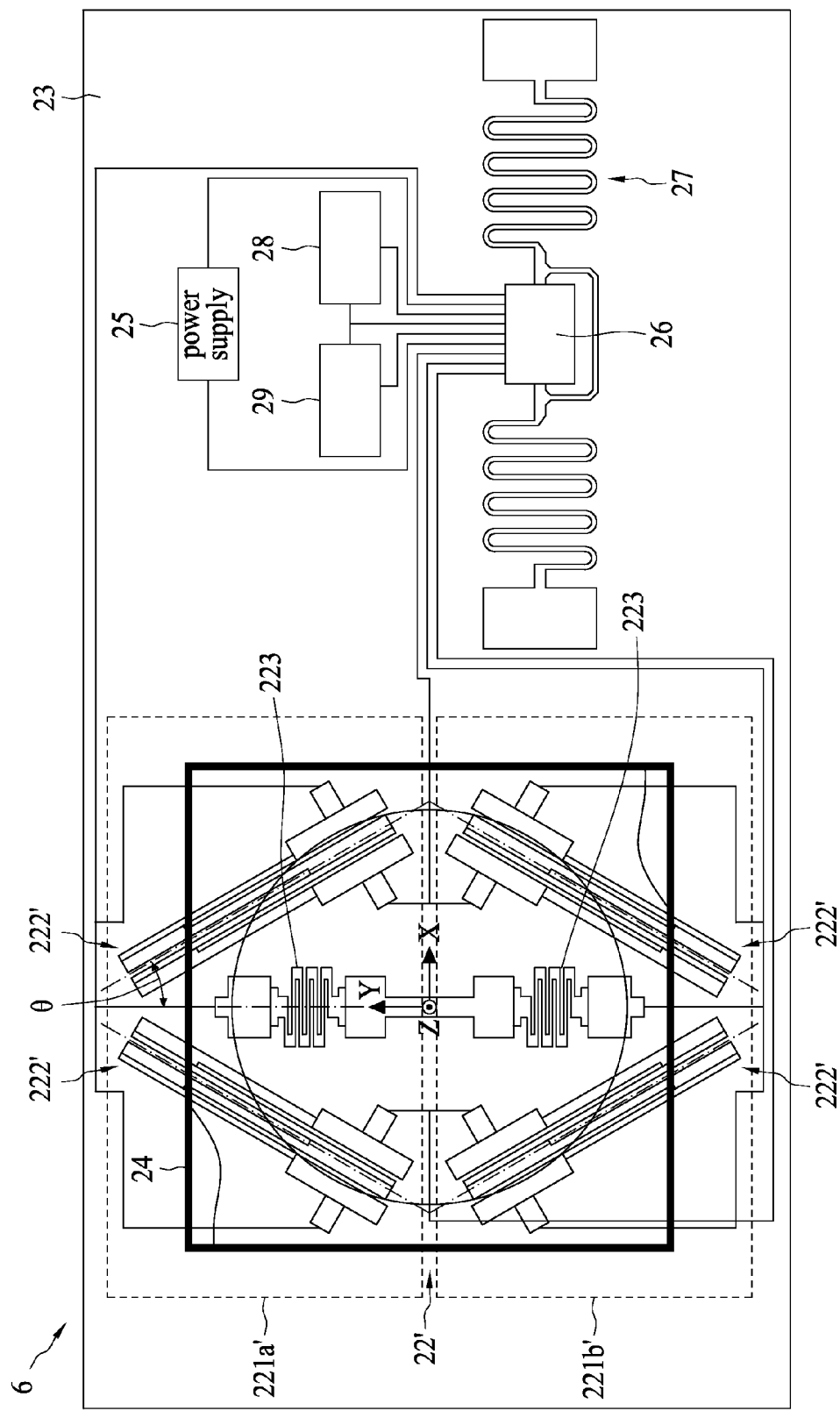
FIG. 6 is a schematic view showing a thermal convection type angular accelerometer according to one embodiment of the present invention.

FIG. 6 is a schematic view showing a thermal convection type angular accelerometer according to one embodiment of the present invention. Compared with the thermal convection type angular accelerometer 2 of FIG. 2, the thermal convection type angular accelerometer 6 of FIG. 6 comprises four different temperature sensing members 222', which are respectively included in sensing groups 221a' or 221b'. The temperature sensing member 222' of the angular acceleration sensing device 22' may comprise a thermopile. The temperature sensing member 222' may comprise a plurality of series-connected thermocouples, in which each thermocouple may comprise a type E thermocouple, a type K thermocouple, a type J thermocouple, or a type T thermocouple. In some embodiments, the thermocouples comprise Chromel alloy, which may include nickel and chromium. In one embodiment, the Chromel alloy comprises 90 to 91 weight percent of chromium and 9 to 10 weight percent of nickel. In one embodiment, the thermocouples comprise Alumel alloy, which may comprise nickel, aluminum, magnesium, and silicon. In some embodiments, the Alumel alloy comprises 16 to 17 weight percent of nickel, 33 to 34 weight percent of aluminum, 33 to 34 weight percent of magnesium, and 16 to 17 weight percent of silicon.

In some embodiments, the thermocouples may comprise Constantan alloy, which comprises nickel and copper. In some embodiments, the Constantan alloy comprises 45 to 46 weight percent of nickel and 54 to 55 weight percent of copper.

The temperature sensing member 222' may comprise only one metal. In some embodiments, the temperature sensing member 222' comprises copper. In some embodiments, the temperature sensing member 222' comprises iron.

In some embodiments, the cover 24 can completely cover the temperature sensing members 222'. In some embodiments, the cover 24 can partially cover the temperature sensing members 222'. The outside portion of each temperature sensing member 222' is exposed to an ambient temperature, which can have an effect of temperature compensation. In some embodiments, the length of the portion of the temperature sensing member 222' exposed outside the cover 24 can be less than half of the total length of the temperature sensing member 222'. In some embodiments, the length of the portion of the temperature sensing member 222' exposed outside the cover 24 can be less than a quarter of the total length of the temperature sensing member 222'. In some embodiments, the length of the portion of the temperature sensing member 222' exposed outside the cover 24 can be between a quarter and half of the total length of the temperature sensing member 222'.

Figure 7:
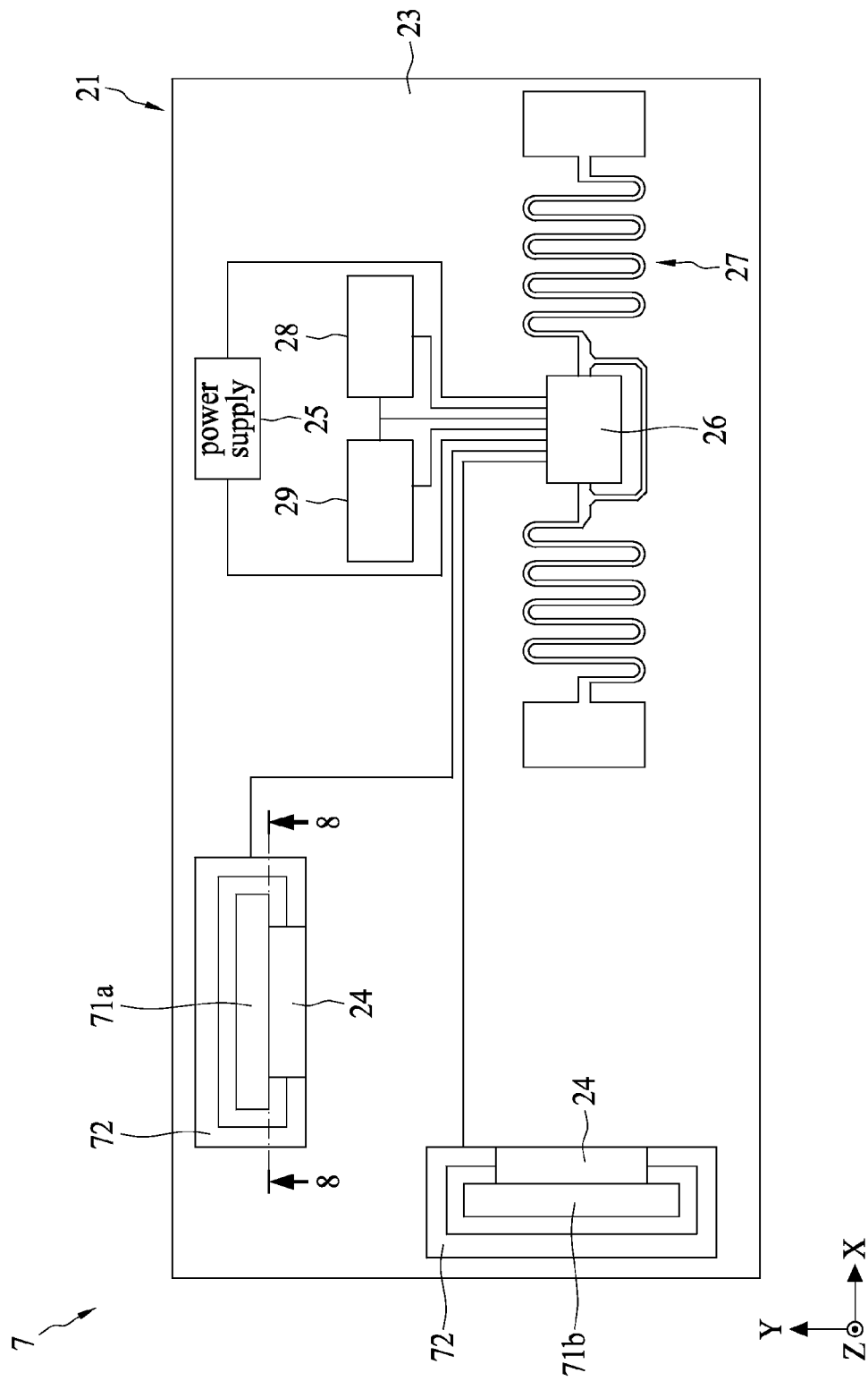
FIG. 7 is a schematic view showing a thermal convection type angular accelerometer according to another embodiment of the present invention.
Figure 8:
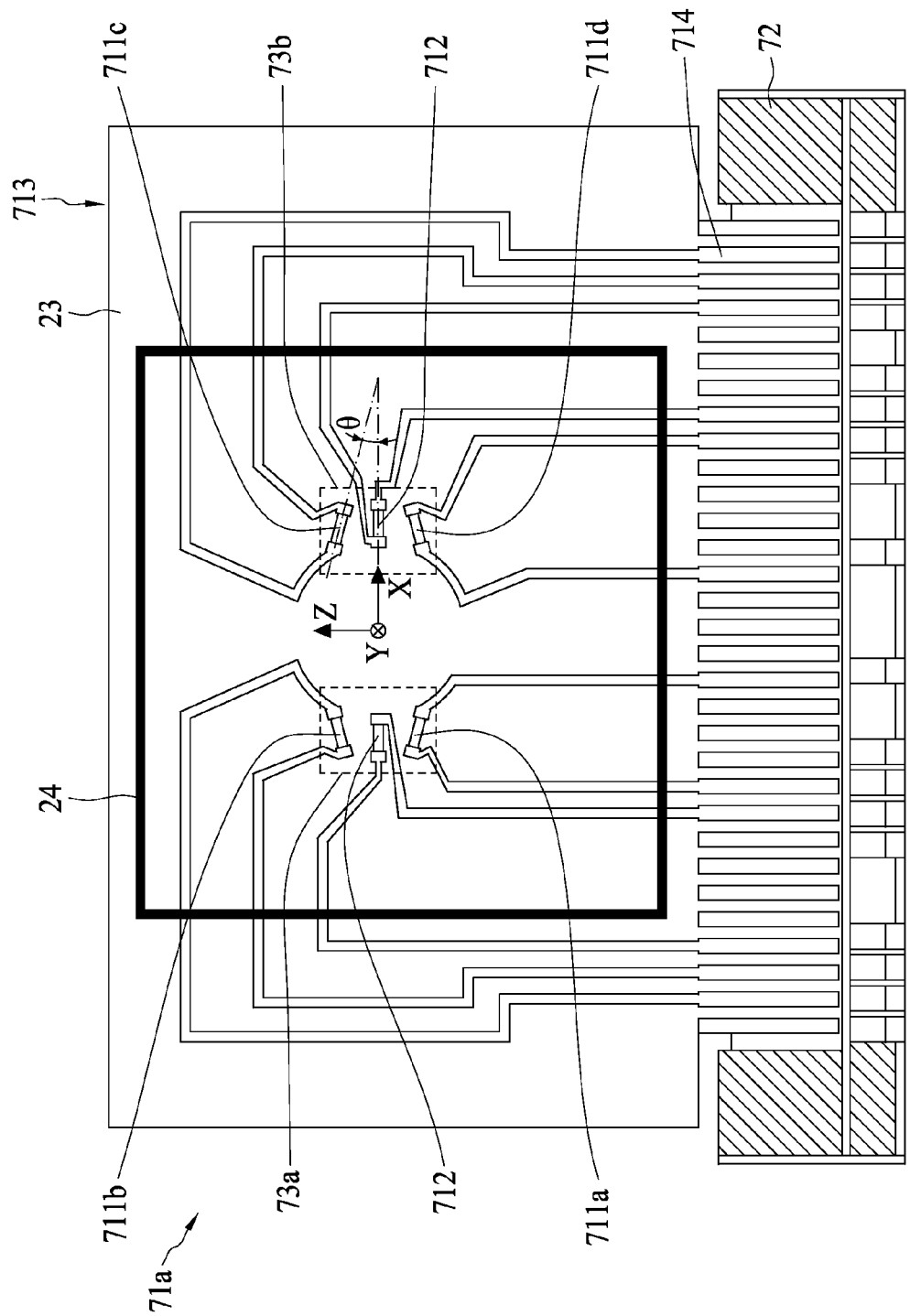
FIG. 8 is a cross-sectional view along line 8-8 of FIG. 7.

FIG. 7 is a schematic view showing a thermal convection type angular accelerometer according to one embodiment of the present invention. FIG. 8 is a cross-sectional view along line 8-8 of FIG. 7. As shown in FIG. 7, the thermal convection type angular accelerometer 7 can be used to measure angular acceleration of the X-axis and/or the Y-axis; however, the present invention is not limited to such embodiments. Referring to FIGS. 7 and 8, due to requirements, the thermal convection type angular accelerometer 7 may comprise an angular acceleration sensing device 71a for measuring angular acceleration of the X-axis and/or an angular acceleration sensing device 71b for measuring angular acceleration of the Y-axis. The angular acceleration sensing device 71a or the angular acceleration sensing device 71b can be inserted in a socket 72. The socket 72 can be disposed on an insulating substrate 21 and comprises a plurality of terminals. The terminals are configured to electrically connect the angular acceleration sensing device 71a or 71b and a circuit disposed on the insulating substrate 21.

As shown in FIG. 8, the angular acceleration sensing device 71a or 71b may comprise at least one sensing group 73a or 73b. In the present embodiment, the thermal convection type angular accelerometer 7 comprises two sensing groups 73a and 73b. Each sensing group 73a or 73b may comprise two temperature sensing members ((711a and 711b) or (711c and 711d)) and a heater 712. The heater 712 can be between the two temperature sensing members ((711a and 711b) or (711c and 711d)). Each temperature sensing member (711a, 711b, 711c, or 711d) can form an included angle θ with the heater 72, wherein the included angle θ can be from 25 to 35 degrees. Preferably, the included angle θ is 30 degrees. The temperature sensing member (711a, 711b, 711c, or 711d) can be similar to the temperature sensing member 222 or the temperature sensing member 222'. The heater 712 can be similar to the heater 223.

The angular acceleration sensing device 71a or 71b may comprise an insulating substrate 713. A supporting layer 23 can be formed on the insulating substrate 713, and the sensing groups 73a and 73b can be attached to the supporting layer 23. The cover 24 can cover the sensing groups 73a and 73b or partially cover the temperature sensing member (711a, 711b, 711c, or 711d).

The angular acceleration sensing device 71a or 71b can further comprise a plurality of pads 714 corresponding to the temperature sensing member (711a, 711b, 711c, or 711d) and the heater 712 of the sensing groups 73a and 73b. The pads 714 can be arranged along an edge of the insulating substrate 713, as shown in FIG. 8. Each pad 714 connects to the corresponding temperature sensing member (711a, 711b, 711c, or 711d) or heater 712. In the present embodiment, each end of each of the temperature sensing members (711a, 711b, 711c, and 711d) and the heater 712 electrically connect to one pad 714. As a result, each of the temperature sensing members (711a, 711b, 711c, and 711d) and the heater 712 electrically connect to two different pads 714.

Referring to FIG. 4, in some embodiments, the memory 262 can store compensation values for deviations of angular speed, acceleration, and rotation angle that are determined using the angular acceleration sensing device 71a or 71b. In some embodiments, the thermal convection of the angular acceleration sensing device 71a or 71b may have asymmetrical temperature distribution from top to bottom under the effect of gravity. The memory 262 stores gravity compensation values of the angular acceleration sensing device 71a or 71b to compensate the errors caused by gravity.

Figure 9:
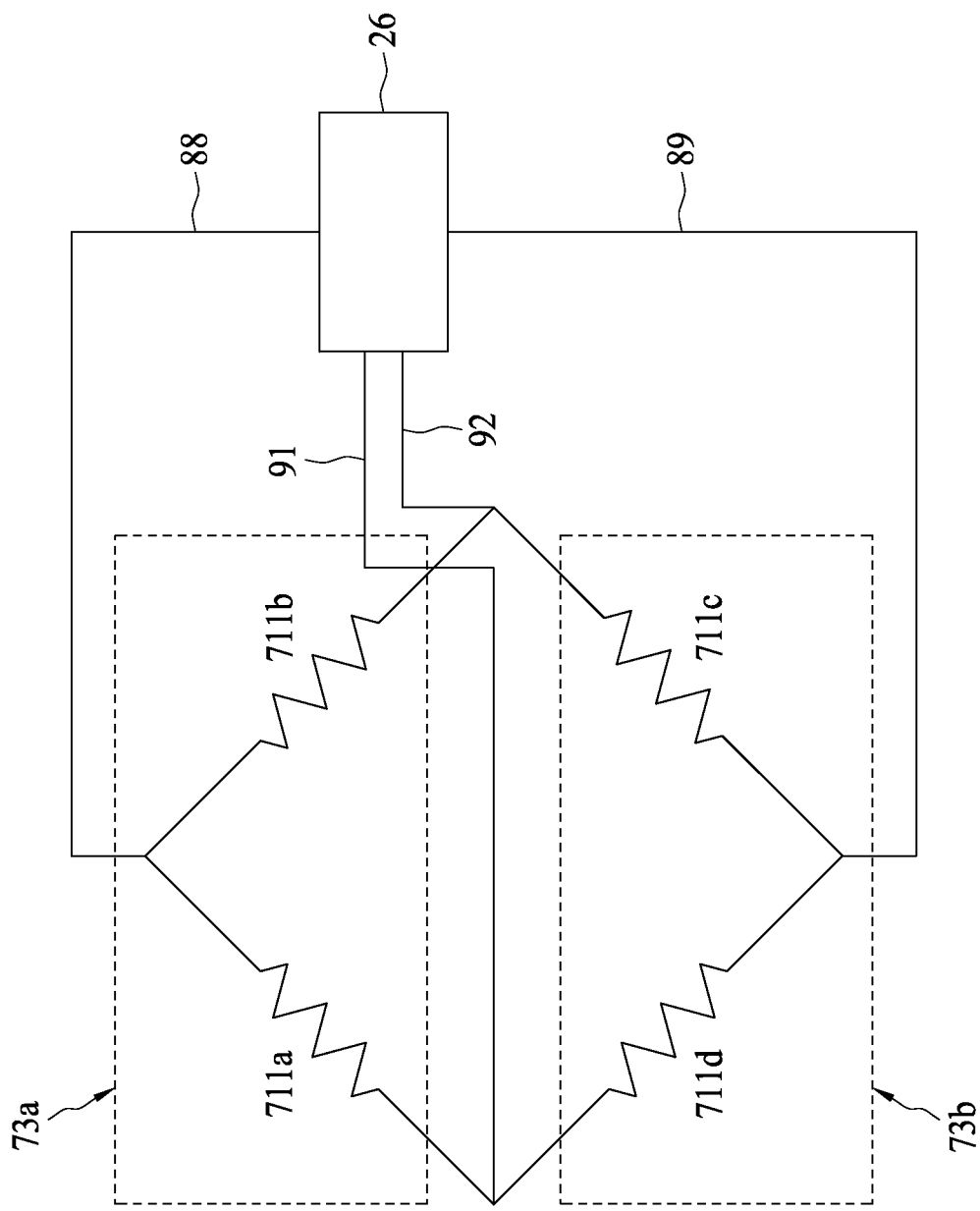
FIG. 9 is a schematic view showing the electrical connection, including a Wheatstone bridge, between the temperature sensing members and the chip of the angular acceleration sensing device according to one embodiment of the present invention.

FIG. 9 is a schematic view showing the electrical connection, including a Wheatstone bridge, between the temperature sensing members (711a, 711b, 711c, and 711d) and the chip 26 of the angular acceleration sensing device 71a according to one embodiment of the present invention. Referring to FIGS. 8 and 9, the sensing groups 73a and 73b correspond to each other. The temperature sensing member 711a of the sensing group 73a can be connected in series with the temperature sensing member 711d of the sensing group 73b. The temperature sensing member 711b of the sensing group 73a can be connected in series with temperature sensing member 711c of the sensing group 73b. The temperature sensing members 711a and 711b are connected with the chip 26 through a wire 88. The temperature sensing member 711c and the temperature sensing member 711d of the sensing group 73b are connected with the chip 26 through a wire 89. Thus, current can be supplied by the chip 26 to the temperature sensing members (711a, 711b, 711c, and 711d) of the sensing groups 73a and 73b.

In some embodiments, a wire 91 is used to connect a connection point of the two temperature sensing members 711a and 711d to the chip 26 so that the chip 26 can obtain a voltage at the connection point. Another wire 92 is used to connect a connection point of the two temperature sensing members 711b and 711c to the chip 26 so that the chip 26 can obtain a voltage at the connection point. The chip 26 can determine angular acceleration according to a difference between the two voltages.

Figure 10:
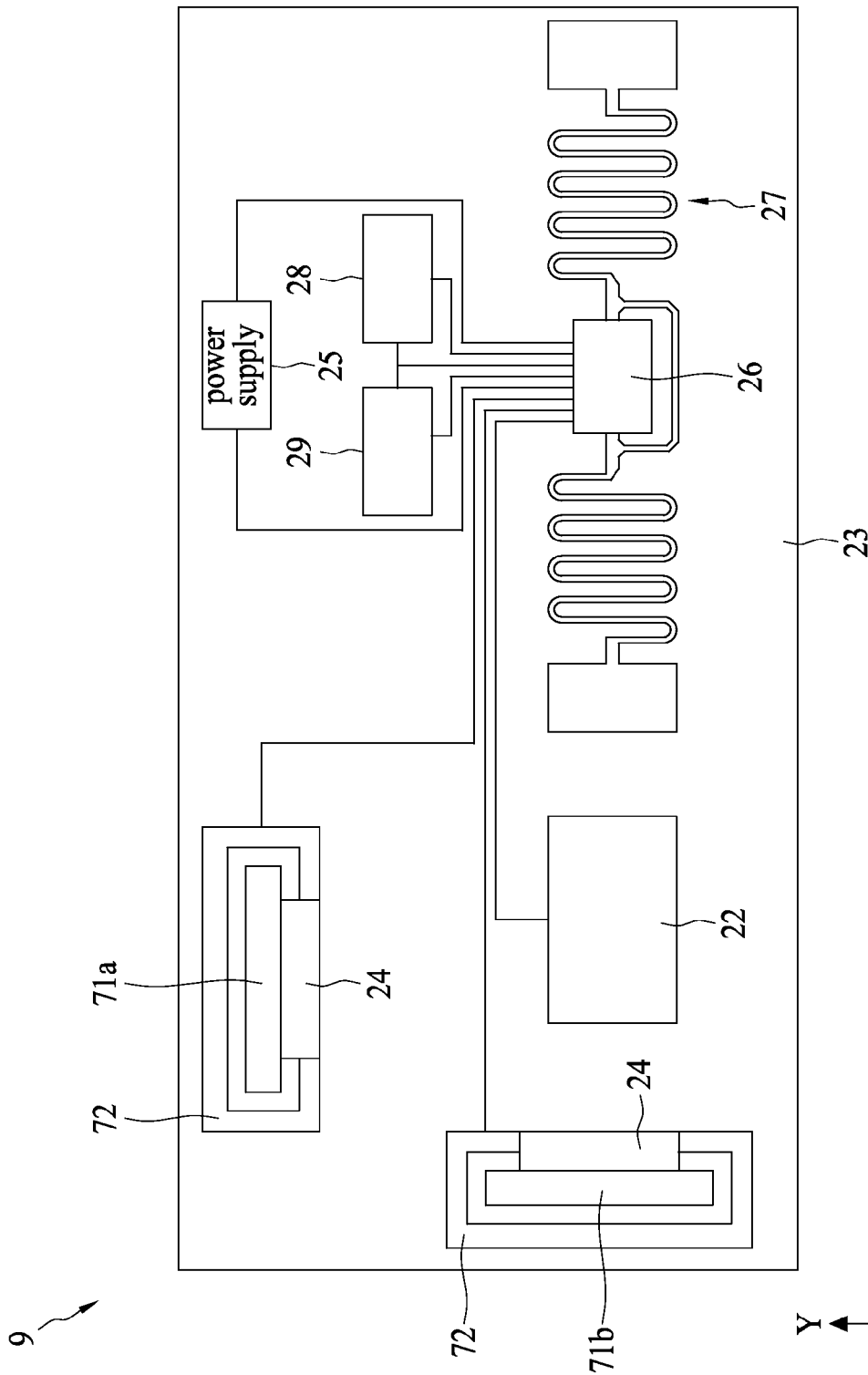
FIG. 10 is a schematic view showing a thermal convection type angular accelerometer according to another embodiment of the present invention.

FIG. 10 is a schematic view showing a thermal convection type angular accelerometer 9 according to another embodiment of the present invention. Referring to FIG. 10, the thermal convection type angular accelerometer 9 can be a combination of the thermal convection type angular accelerometer 2 of FIG. 2 and the thermal convection type angular accelerometer 7 of FIG. 7 or of the thermal convection type angular accelerometer 6 of FIG. 6 and the thermal convection type angular accelerometer 7 of FIG. 7. Therefore, the thermal convection type angular accelerometer 9 can simultaneously measure angular accelerations of the X-axis, Y-axis, and Z-axis.

Figure 11:
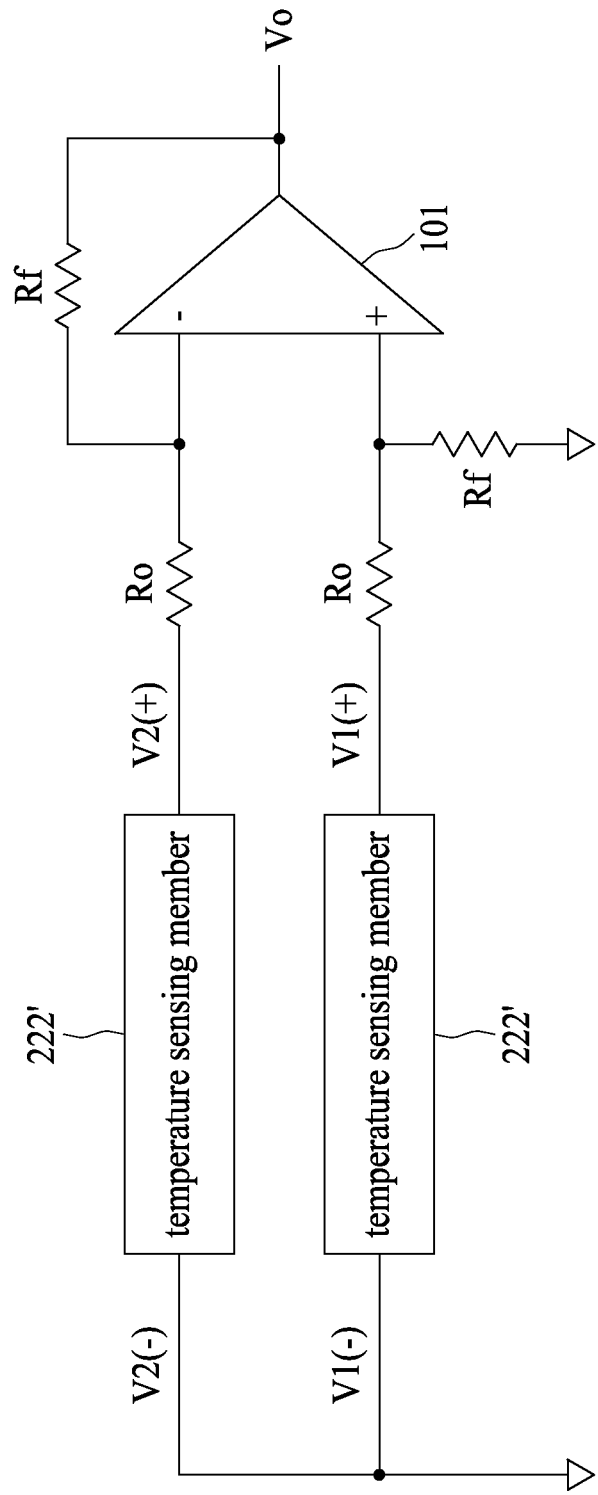
FIG. 11 is a schematic view showing a circuit including wires for connecting two temperature sensing members and a subtractor according to one embodiment of the present invention.

Referring to FIGS. 1, 6 and 11, in some embodiments, the outputs of the temperature sensing members 222' can connect to the control and amplification device 124 as shown in FIG. 1 and respectively provide a V2(+) voltage and a V1(+) voltage. The control and amplification device 124 may comprise a subtracter 101. The two temperature sensing members 222' of each sensing group 221a' or 221b' respectively connect to the positive and negative terminals of the subtracter 101 through resistors Ro. Such an embodiment of FIG. 11 can compensate for errors caused by the change of an ambient temperature, the geometric deviations of thermopiles, and common mode interferences, as well as provide correct voltage outputs generated due to temperature differences caused by angular acceleration.

The afore-mentioned embodiments can be formed by the method disclosed in U.S. patent application Ser. No. 13/685,398, the disclosure of which is hereby incorporated by reference herein in its entirety.

Figure 12:
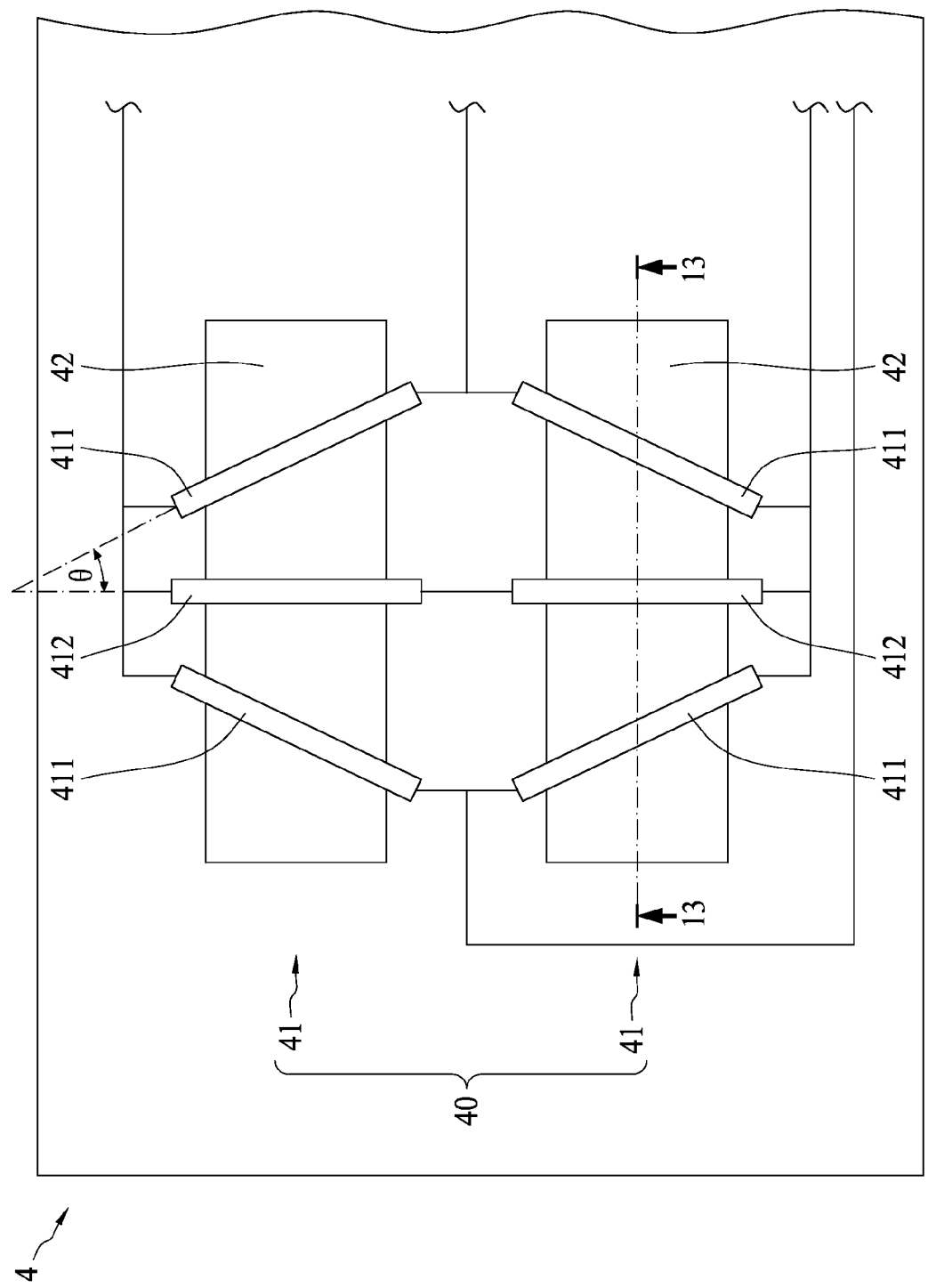
FIG. 12 is a schematic view showing a thermal convection type angular accelerometer according to another embodiment of the present invention.
Figure 13:
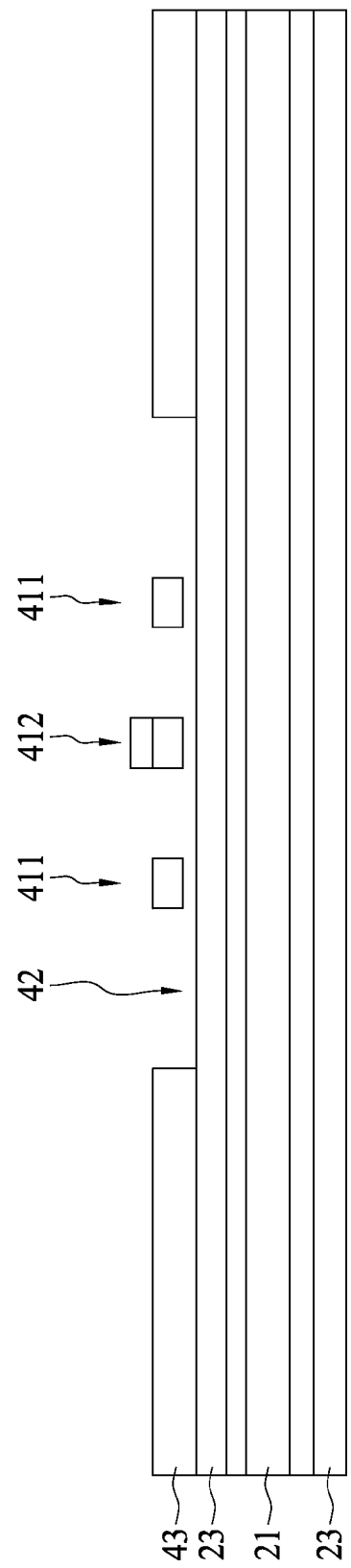
FIG. 13 is a cross-sectional view along line 13-13 of FIG. 12.

FIG. 12 is a schematic view showing a thermal convection type angular accelerometer 4 according to another embodiment of the present invention. FIG. 13 is a cross-sectional view along line 13-13 of FIG. 12. Referring to FIGS. 12 and 13, the thermal convection type angular accelerometer 4 can be used to measure angular accelerations of the X-axis, Y-axis, or Z-axis. The thermal convection type angular accelerometer 4 may comprise pads for connecting with the terminals of a socket. The thermal convection type angular accelerometer 4 comprises an angular acceleration sensing device 40, including two sensing groups 41. Each sensing group 41 comprises two temperature sensing members 411 and a heater 412. Each temperature sensing member 411 forms an included angle θ with the heater 412, wherein the included angle θ can be between 25 and 35 degrees, and is preferably 30 degrees. The angular acceleration sensing device 40 can be disposed over a cavity 42. In the present embodiment, each sensing group 41 is disposed over a cavity 42.

Similarly, the thermal convection type angular accelerometer 4 comprises an insulating substrate 21. A photo-resist layer 43 can be formed on the insulating substrate 21, and the cavity 42 can be formed using a lithographic process. In one embodiment, the photo-resist layer 43 comprises an SU-8 photo-resist. The method of manufacturing an angular acceleration sensing device 40 extending across a cavity 42 can be referred to U.S. patent application Ser. No. 12/767,597, the disclosure of which is hereby incorporated by reference herein in its entirety.

Figure 14:
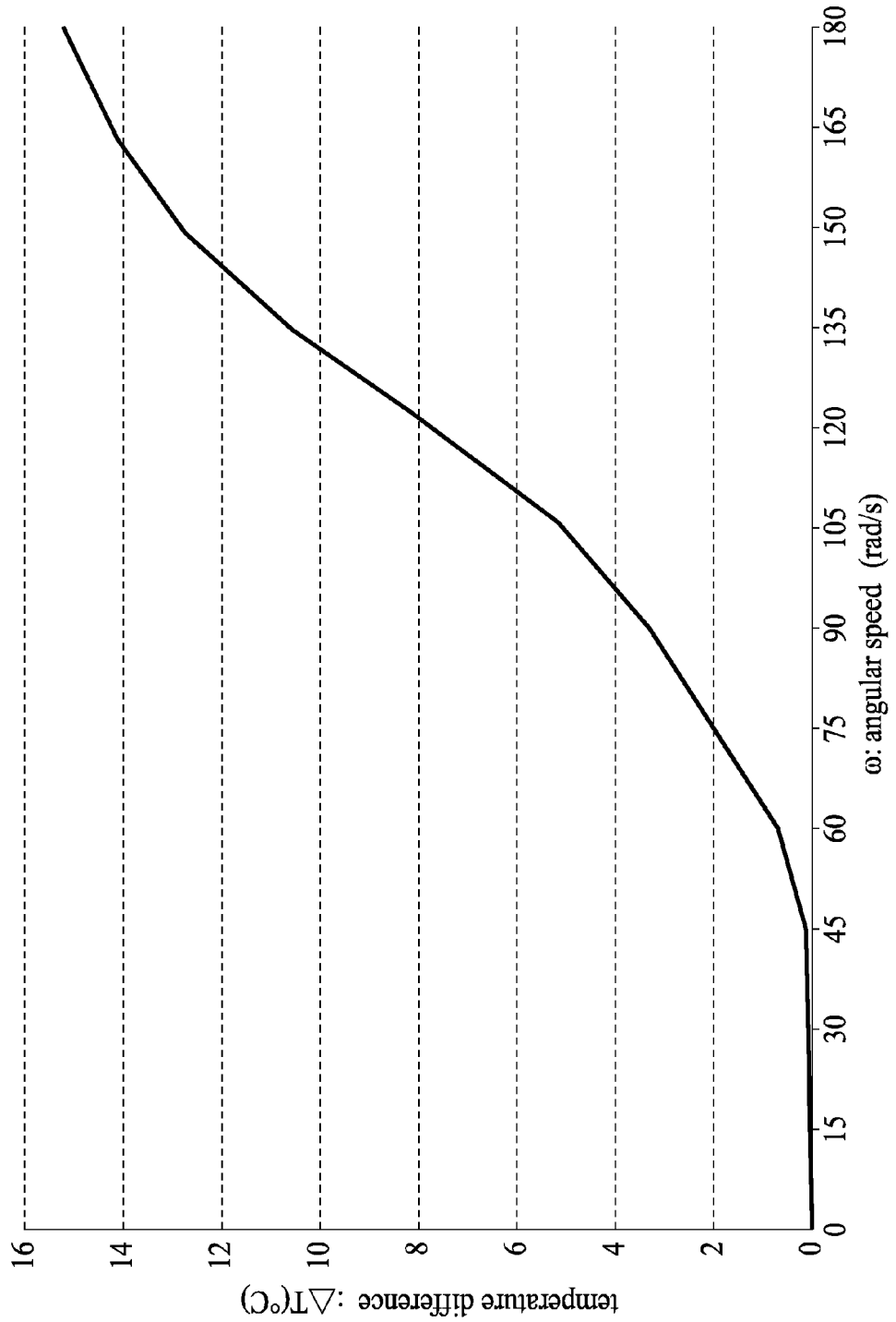
FIG. 14 is a diagram showing the nonlinear relationship between temperature differences and angular speeds (w) obtained by using a present thermal convection type angular accelerometer which includes a heater and temperature sensors that are formed in parallel to each other.
Figure 15:
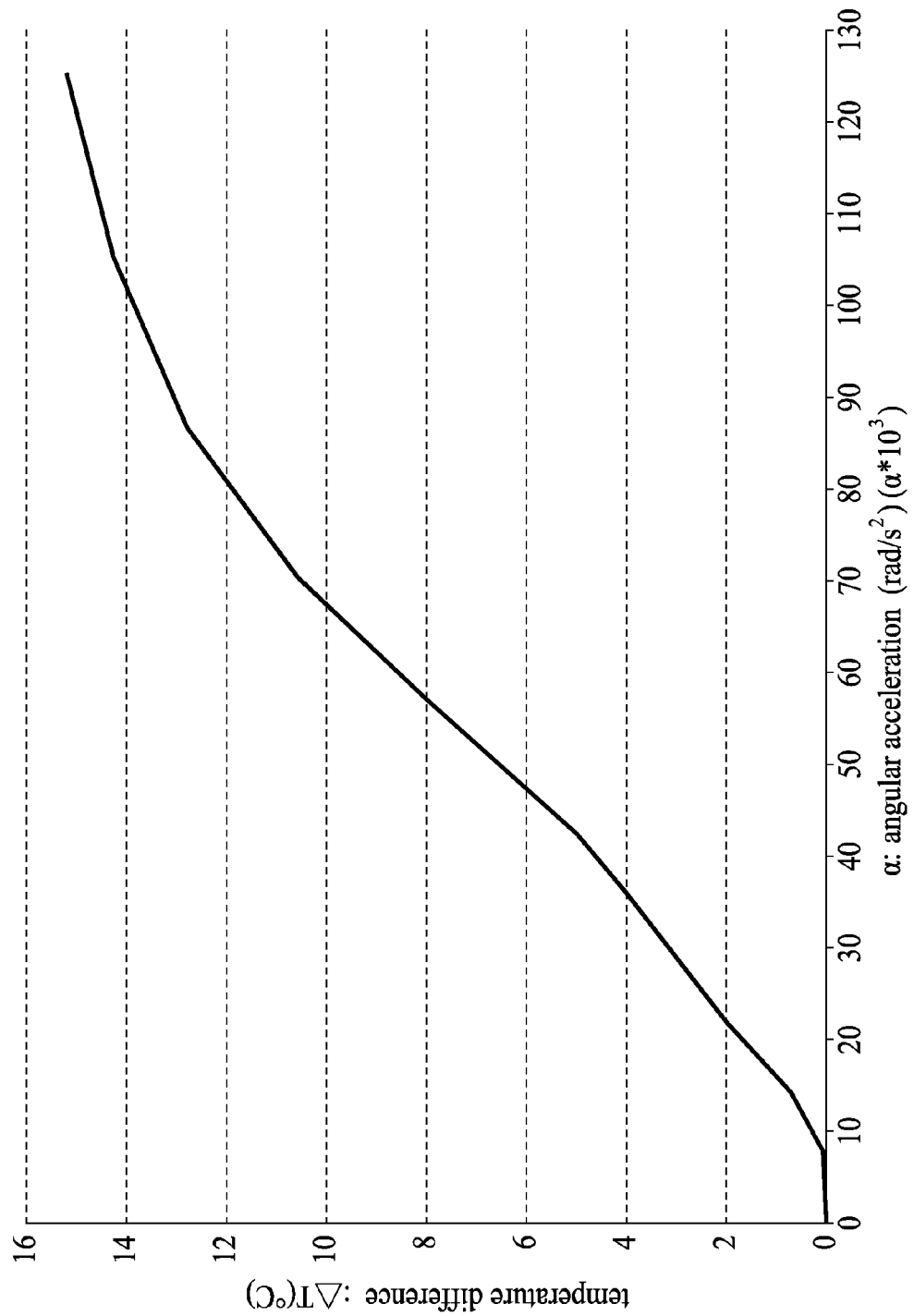
FIG. 15 is a diagram showing the linear relationship between temperature differences and accelerations obtained by using a thermal convection type angular accelerometer according to one embodiment of the present invention.

FIG. 14 is a diagram showing the relationship between temperature differences and angular accelerations obtained by using a present thermal convection type angular accelerometer, which includes a heater and temperature sensors that are formed in parallel to each other. FIG. 15 is a diagram showing the relationship between temperature differences and angular accelerations obtained by using a thermal convection type angular accelerometer according to one embodiment of the present invention. As shown in FIGS. 14 and 15, the angular speeds (w) of the present angular accelerometer and its output temperature differences are not in a linear relationship. However, the angular accelerations (a) of the thermal convection type angular accelerometer of one embodiment of the present invention and its output temperature differences are in a linear relationship. Because of the linear relationship of temperature differences to angular accelerations, the thermal convection type angular accelerometer of one embodiment of the present invention can provide more accurate angular acceleration and an angular speed obtained by integration.

The above-described embodiments of the present invention are intended to be illustrative only. Numerous alternative embodiments may be devised by persons skilled in the art without departing from the scope of the following claims.

What is claimed is:

1. A thermal convection type angular accelerometer comprising:
   a first insulating substrate; and
   a first angular acceleration sensing device disposed on the first insulating substrate and configured to measure an angular acceleration of a first axis, wherein the first angular acceleration sensing device comprises a sensing group, wherein the sensing group comprises two temperature sensing members and a heater disposed between the two temperature sensing members, wherein a distance between two ends of the two temperature sensing members near the first axis is greater than the distance between two ends of the two temperature sensing members that are farther from the first axis.

2. The thermal convection type angular accelerometer of claim 1, wherein an included angle between the heater and each temperature sensing member is between 25 to 35 degrees.

3. The thermal convection type angular accelerometer of claim 1, further comprising a first supporting layer disposed on the first insulating substrate and configured to support the first angular acceleration sensing device.

4. The thermal convection type angular accelerometer of claim 3, wherein the first supporting layer comprises a positive photo-resist layer.

5. The thermal convection type angular accelerometer of claim 1, wherein the first insulating substrate comprises a first cavity, over which the first angular acceleration sensing device is disposed.

6. The thermal convection type angular accelerometer of claim 1, further comprising a cover partially covering the two temperature sensing members and an inert gas disposed within the cover.

7. The thermal convection type angular accelerometer of claim 1, wherein the heater comprises nickel or chromium.

8. The thermal convection type angular accelerometer of claim 1, wherein each temperature sensing member comprises at least one resistor or a plurality of series-connected thermocouples.

9. The thermal convection type angular accelerometer of claim 8, wherein each thermocouple comprises chromel alloy or alumel alloy.

10. The thermal convection type angular accelerometer of claim 1, wherein each temperature sensing member comprises doped p-type poly-silicon.

11. The thermal convection type angular accelerometer of claim 1, further comprising a chip and a plurality of pads corresponding to the two temperature sensing members and the heater, wherein the plurality of pads respectively connect to the chip, and the chip is configured to simultaneously supply electrical power to the heater and the two temperature sensing members to measure angular acceleration, wherein the chip is configured to provide electrical pulses of power.

12. The thermal convection type angular accelerometer of claim 11, wherein each of the two temperature sensing members and the heater connect to a different pad.

13. The thermal convection type angular accelerometer of claim 1, comprising two sensing groups, wherein the heaters of the two sensing groups are series-connected, and one temperature sensing member of one of the two sensing groups is series-connected with a corresponding one temperature sensing member of another of the two sensing groups.

14. The thermal convection type angular accelerometer of claim 1, further comprising:
 a first socket disposed on the first insulating substrate;
 a second insulating substrate, which can be inserted into the first socket;
 a plurality of pads disposed on the second insulating substrate; and
 a second angular acceleration sensing device disposed on the second insulating substrate and configured to measure angular acceleration of a second axis, wherein the second angular acceleration sensing device comprises a sensing group comprising:
  two temperature sensing members coupled with corresponding pads of the plurality of pads; and
  a heater disposed between the two temperature sensing members of the second angular acceleration sensing device;
  wherein a distance between two ends of the two temperature sensing members of the second angular acceleration sensing device near the second axis is greater than two ends of the temperature sensing members of the second angular acceleration sensing device that are farther from the second axis.

15. The thermal convection type angular accelerometer of claim 14, wherein an included angle between the heater and each temperature sensing member of the second angular acceleration sensing device is between 25 to 35 degrees.

16. The thermal convection type angular accelerometer of claim 14, further comprising a second supporting layer attached to the second insulating substrate and configured to support the second angular acceleration sensing device.

17. The thermal convection type angular accelerometer of claim 14, wherein the second insulating substrate comprises a second cavity, over which the second angular acceleration sensing device is disposed.

18. The thermal convection type angular accelerometer of claim 14, wherein the second angular acceleration sensing device comprises two corresponding sensing groups.

19. The thermal convection type angular accelerometer of claim 14, further comprising:
 a second socket disposed on the first insulating substrate and configured to extend perpendicularly to the first socket;
 a third insulating substrate, which can be inserted into the second socket;
 a plurality of pads disposed on the third insulating substrate; and
 a third angular acceleration sensing device disposed on the third insulating substrate and configured to measure angular acceleration of a third axis, wherein the third angular acceleration sensing device comprises a sensing group comprising:
  two temperature sensing members correspondingly coupled with the plurality of pads on the third insulating substrate; and
  a heater disposed between the two temperature sensing members of the third angular acceleration sensing device;
  wherein a distance between two ends of the two temperature sensing members of the third angular acceleration sensing device near the third axis is greater than a distance between two ends of the two temperature sensing members of the third angular acceleration sensing device that are farther from the third axis.

20. The thermal convection type angular accelerometer of claim 19, which further comprises a third supporting layer attached to the third insulating substrate and configured to support the two temperature sensing members and the heater of the third angular acceleration sensing device.

21. The thermal convection type angular accelerometer of claim 19, wherein the third insulating substrate comprises a third cavity, over which the third angular acceleration sensing device is disposed.

* * * * *